Feb. 13, 1923.

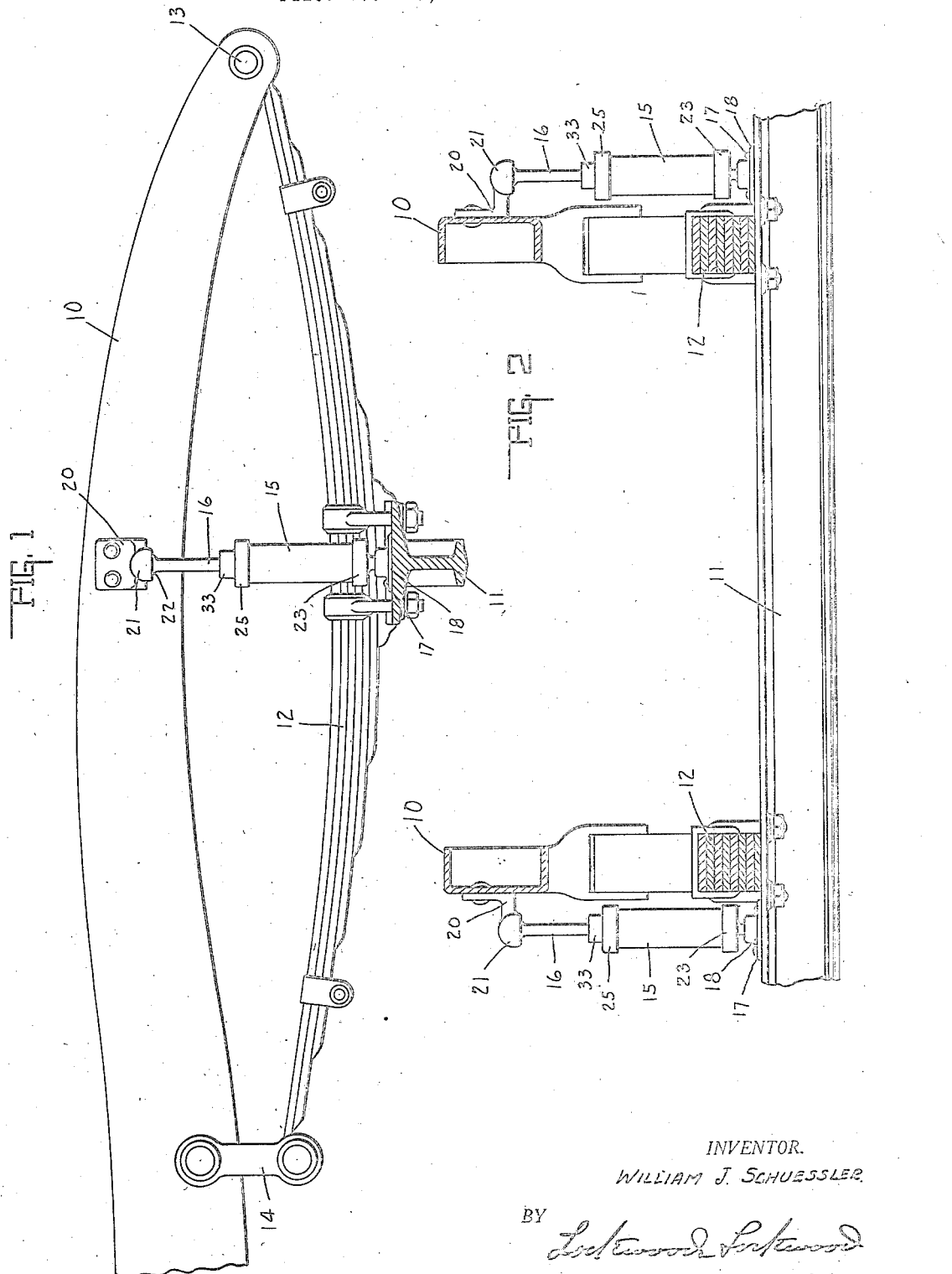

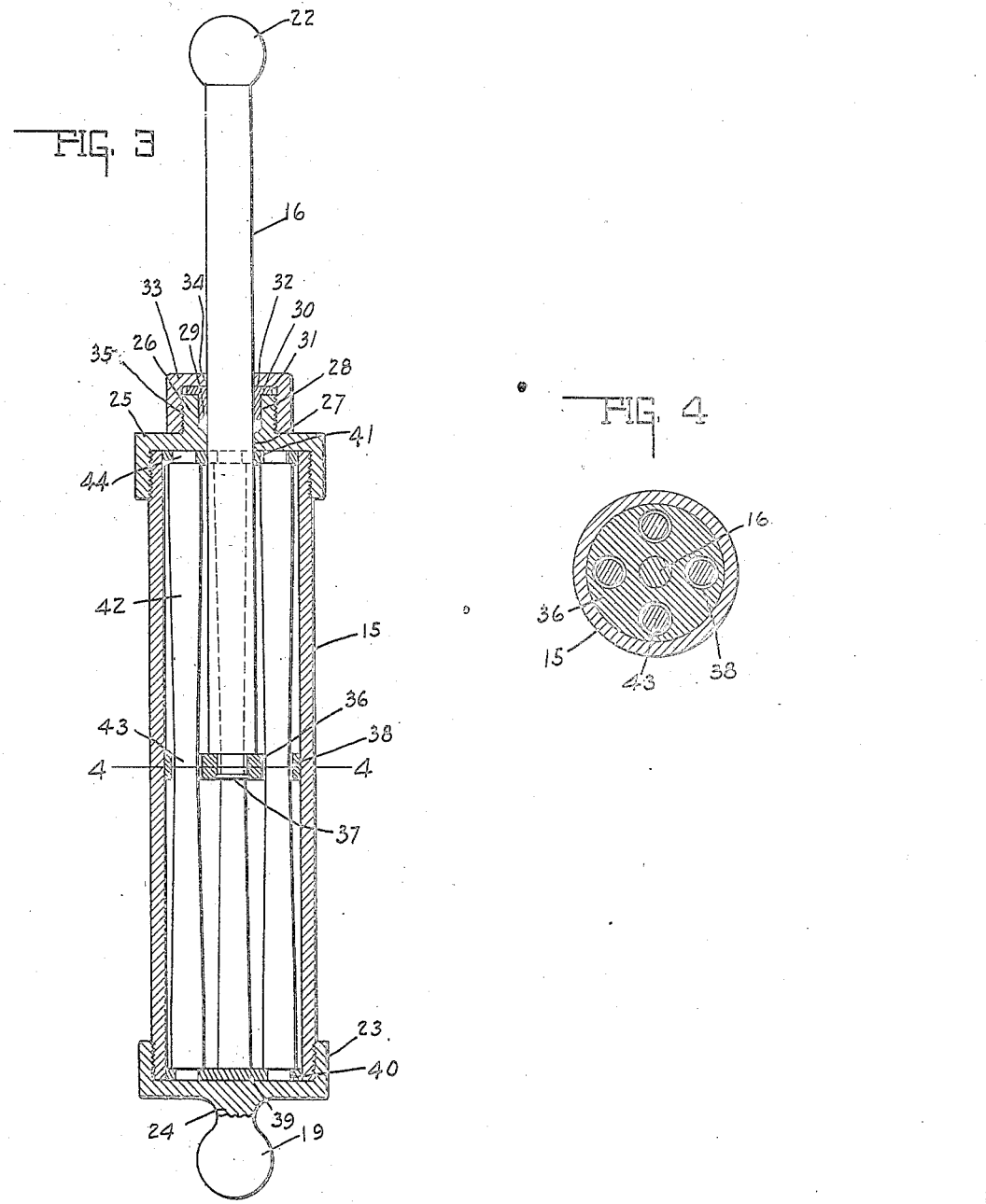

W. J. SCHUESSLER

SHOCK ABSORBER

Filed Dec. 13, 1920

1,445,414

3 sheets-sheet 3

INVENTOR.
WILLIAM J. SCHUESSLER

BY

*Lockwood Lockwood*
ATTORNEYS

Patented Feb. 13, 1923.

1,445,414

UNITED STATES PATENT OFFICE.

WILLIAM J. SCHUESSLER, OF KNOX, INDIANA.

SHOCK ABSORBER.

Application filed December 13, 1920. Serial No. 430,308.

*To all whom it may concern:*

Be it known that I, WILLIAM J. SCHUESSLER, a citizen of the United States, and a resident of Knox, county of Starke, and State of Indiana, have invented a certain new and useful Shock Absorber; and I do hereby declare that the following is a full, clear, and exact description thereof, reference being had to the accompanying drawings, in which like numerals refer to like parts.

This invention relates to shock absorbers, and in particular to those of the fluid compressible type.

The chief object of this invention is to simplify the construction of a fluid compressible shock absorber whereby the cost of manufacturing the same will be reduced and the practical utility and durability of the mechanism will be amplified.

Another object of the invention is to provide means which is associated with the aforesaid simplified fluid compressible shock absorber whereby the same may be associated with and attached to the differential housing and frame adjacent thereto. The full nature of the drawings will be understood from the accompanying drawings and the following description and claims.

Figure 5:
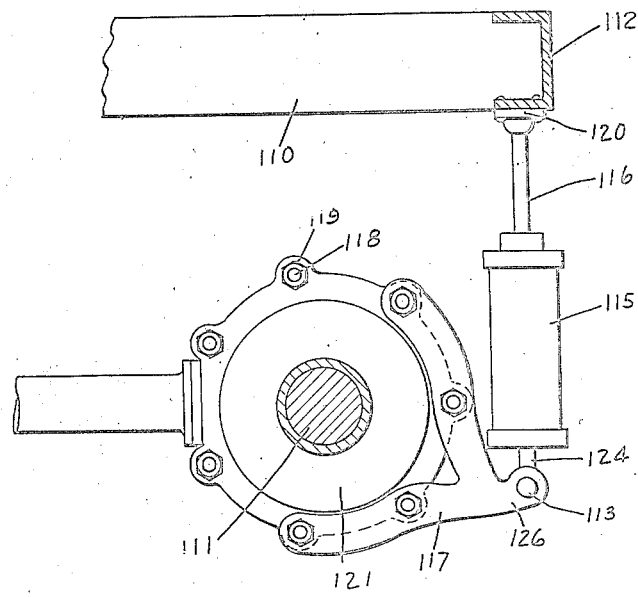
Figure 6:
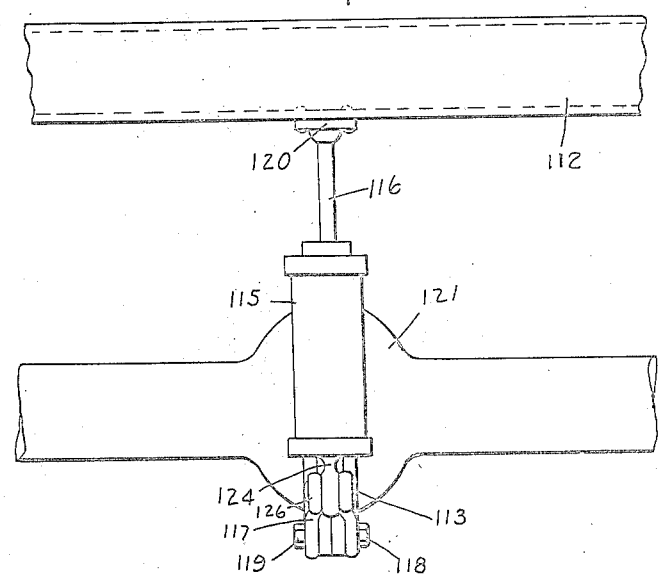

In the drawings, Fig. 1 is a side elevational view of a portion of a vehicle equipped with a shock absorber embodying the invention. Fig. 2 is a transverse view of the frame and wheel supporting means of a vehicle and the shock absorbing means associated therewith. Fig. 3 is an enlarged central sectional view of the shock absorber. Fig. 4 is a cross sectional view of the shock absorber taken on the line 4—4 of Fig. 3. Fig. 5 is a longitudinal sectional view of the transmission end of a motor vehicle illustrating the invention directly applied thereto. Fig. 6 is an elevational view of the invention taken in a plane at right angles to that of Fig. 5.

In the drawings 10 indicates a channel-shaped chassis member constituting a part of the vehicle frame, 11 indicates an axle or wheel supporting member which is yieldingly supported upon said frame by means of the vehicle spring 12, which in the present instance is hinged at 13 to said frame 10 and is shackled by the shackle 14 to said frame. The shock absorber comprises a cylinder portion 15 and a piston rod 16. The cylinder 15 is secured to one of the members 10 or 11, and preferably to the member 11. The means for securing said cylinder to said wheel supporting member comprises a bracket plate 17 provided with a socket 18 adapted to receive the ball 19 of the cylinder. Similarly, the piston rod 16 is supported upon the other vehicle member, and preferably as illustrated the chassis frame member 10, by a bracket 20 providing a socket portion 21 adapted to receive the ball 22. The cylinder is preferably secured to the lower member since the same provides that the only opening will be at the top thereof, and, therefore, the fluid contained within the cylinder 15 will be more easily retained therein. All of the foregoing is old in the art of shock absorbers of the fluid type.

The broad construction of the invention is illustrated in detail in Figs. 3 and 4, and reference will be had to said figures. The cylinder 15 comprises a tube or pipe portion externally threaded at each end, and upon the lower end is secured a cap 23, which cap is connected with the ball member 19 by the neck portion 24. Preferably the cap, neck and ball 19 is formed integral. The piston rod 16 is slidably supported in a top closure member such as the cap 25, which cap has a threaded engagement with the threaded upper end of the pipe portion 15. The cap 25 is provided with an annular flange 26, which is externally threaded, and said cap is also provided with a central opening 27, as well as an enlarged opening 28 communicating with the central opening 27. The piston rod 16 is slidably supported in the opening 27, and adjacent said opening and in the opening 28 is positioned suitable packing means 29, which packing means is secured in said opening by means of the gland 30 seatable in the opening 28 and provided with a peripheral flange 31 bearing against the end of the annular flange 26. The gland 30 is also provided with a central opening 32 which communicates with and is axially aligned with the opening 27 such that the piston rod 16 will be slidably supported by said gland and said cap closure member 25. A cap 33 provided with a registering opening 34 to permit the rod member 16 to be slidable therethrough is internally threaded at 35 for engagement with the externally threaded portion of the annular flange 26 to clamp the gland 30 upon the annular flange 26 to provide a leak-proof joint around said piston rod 16. With the foregoing construction it will be understood that ready access may be had to the interior of the cylinder. It will also be understood that the cylinder can be very cheaply constructed, since the cap member 26, cap member 33, and the pipe portion or nipple 15 can be made of standard parts. The piston 36 is detachably secured to the piston rod 16 and to the end thereof by any suitable means, such as the countersunk screw or bolt 37. The piston 36 is provided with a plurality of openings 38 in spaced relation with each other and positioned around the piston rod support. Positioned in each end of the cylinder and bearing against the respective end closing caps, is a plate member 39, each of which is provided with a plurality of holes 40, said holes likewise being in spaced relation with each other, as shown.

The upper plate member 39 is provided with a central opening 41 such that the piston rod 16 is slidable therethrough. The openings 40 in each of the plates and the openings 38 in the piston 36 are adapted to be positioned in aligned relation, as well as in spaced relation, as hereinbefore described. Extending between each pair of aligned openings 40 in the plates 39 is a rod member 42, which rod member is inwardly tapered from the ends thereof such that 43 constitutes the greatest reduced portion, and said reduced portion 43 is positioned at the center of said rod member or equidistant from the ends thereof. Each of the rod members 42 is reduced at 44 to provide a bearing portion seatable in one of the openings 40. It will, of course, be understood that the openings 38 are equal in diameter to the greatest diameter of the exposed portion of the tapered rod 42, which as hereinbefore described occurs adjacent the spacing and retaining end plates 39. Thus, the fluid within the cylinder 15, upon shock and rebound, is compelled to pass through the port openings 38 so as to permit the piston to travel within said cylinder. As said piston travels from the neutral position indicated in Fig. 3 to either of the shock absorbing or rebound absorbing positions, the annular opening between the opening 38 in the piston 36 and the tapered rod 42 decreases with the movement of said piston from the central or neutral position towards the end of the rebound or shock absorbing positions. Thus, the resistance of the shock absorber increases as the piston approaches the ends of the cylinder, since the fluid passing from one side of the piston to the other side thereof is increasingly retarded as the piston approaches the end, thereby increasing the shock and rebound absorbing capacity of the shock absorber. It will be readily understood that slight shocks and rebounds will be quickly absorbed and excessive shocks and rebounds will also be absorbed due to the increasing resistance thereto, which as heretofore explained increases with the extent of said shock or rebound.

The chief feature of the construction as hereinbefore described consists in the utilization of standard parts and the use of tapered rod members with the same, it being much cheaper to taper the rod member 42 or a plurality thereof than it is to taper a cylindrical opening, which heretofore has been the practice, or to provide tapered grooves within a cylindrical surface.

In the modification illustrated in Figs. 5 and 6, the invention is illustrated as directly applied to the axle housing. In this instance the chassis frame 110 is provided with an end frame portion or member 112, and suitably secured thereto on the socket-forming bracket 120 associated with the axle or shaft 111 is the usual differential housing 121 comprised of two parts secured together by the bolts and nuts 118 and 119 respectively. Secured to the housing 121 is suitable bracket means such as the V, an angle shaped bracket 117. The bracket means 117 is preferably secured by means of the bolt and nut means 118 and 119. The bracket 117 at its mid portion is provided with a pivot supporting portion 126 in which is supported the pivot pin 113. Pivotally supported by the pin 113 is the base 124 of the cylinder 115. Said cylinder is provided with the usual means as that hereinbefore described, as desired, and the piston rod 116 is suitably supported by the socket bracket 120. The operation of the device is substantially similar or identical with that hereinbefore described in detail.

The invention claimed is:

1. In a motor vehicle, the combination with a chassis frame, and a differential yieldingly supported by said frame, of fluid pressure shock absorber means suitably secured at one end to the chassis frame, and bracket means secured to said differential and securing said shock absorbing means thereto.

2. A shock absorber for a vehicle including a wheel supporting member and a frame member, comprising a fluid containing cylinder open at both ends, a piston in said cylinder, said piston having a plurality of openings in spaced relation with each other and extending therethrough, a plurality of inwardly tapered rods extending longitudinally of and within said cylinder, said rods being positioned in the piston openings, the latter being substantially equal in area to the larger portions of said tapered rods, a plate positioned at each end of the cylinder and provided with openings adapted to receive the ends of said elongated rods to maintain the same in parallel relation, a cap for one end of the cylinder to close said cylinder and secure said plate to the end of the cylinder, a second cap provided with a central opening therethrough adapted to close the other end of the cylinder and to secure the other plate to said cylinder at the end thereof, and a piston rod in the second mentioned cap and slidably supported in the opening thereof, said rod being supported by one of said vehicle members, the cylinder being supported by the other vehicle member.

In witness whereof I have hereunto affixed my signature.

WILLIAM J. SCHUESSLER.